United States Patent
Hird et al.

(10) Patent No.: US 12,393,248 B2
(45) Date of Patent: Aug. 19, 2025

(54) DEVICES, SYSTEMS, AND METHODS FOR COLLECTING DOWNHOLE MEASUREMENTS

(71) Applicant: Schlumberger Technology Corporation, Sugar Land, TX (US)

(72) Inventors: Jonathan Robert Hird, Cambridge (GB); Andrew David Robinson, Cambridge (GB)

(73) Assignee: Schlumberger Technology Corporation, Sugar Land, AS (US)

( * ) Notice: Subject to any disclaimer, the term of this patent is extended or adjusted under 35 U.S.C. 154(b) by 114 days.

(21) Appl. No.: 18/479,412

(22) Filed: Oct. 2, 2023

(65) Prior Publication Data
US 2024/0152195 A1  May 9, 2024

Related U.S. Application Data

(60) Provisional application No. 63/382,226, filed on Nov. 3, 2022.

(51) Int. Cl.
| | | |
|---|---|---|
| G06F 1/00 | (2006.01) | |
| G06F 1/3209 | (2019.01) | |
| H01H 19/58 | (2006.01) | |
| G06F 1/3203 | (2019.01) | |

(52) U.S. Cl.
CPC ......... G06F 1/3209 (2013.01); H01H 19/585 (2013.01); *G06F 1/3203* (2013.01)

(58) Field of Classification Search
CPC ...... G06F 1/3209; H01H 19/585; E21B 47/00
USPC .......................................................... 713/310
See application file for complete search history.

(56) References Cited

U.S. PATENT DOCUMENTS

| 3,713,334 | A  | * | 1/1973  | Vann ........................ E21B 47/26 166/241.6 |
|---|---|---|---|---|
| 5,812,068 | A  | * | 9/1998  | Wisler ..................... E21B 47/26 175/45 |
| 10,968,731 | B2 | * | 4/2021  | Gupta .................... E21B 33/064 |
| 2001/0039626 | A1 | * | 11/2001 | Jauert .............. G07B 17/00314 713/300 |
| 2005/0284659 | A1 | * | 12/2005 | Hall ....................... H04L 67/025 175/27 |
| 2016/0290118 | A1 | * | 10/2016 | Xue ......................... E21B 47/00 |
| 2017/0002640 | A1 | * | 1/2017  | Hoefel ............... G05B 23/0291 |
| 2017/0269260 | A1 | * | 9/2017  | Chen ....................... E21B 49/08 |
| 2018/0106927 | A1 | * | 4/2018  | Larimore ............... E21B 43/04 |
| 2020/0370375 | A1 | * | 11/2020 | Gleitman ............... E21B 44/00 |
| 2021/0372261 | A1 | * | 12/2021 | Miller ................ G05B 13/0265 |

* cited by examiner

*Primary Examiner* — Volvick Derose
(74) *Attorney, Agent, or Firm* — Jeffrey D. Frantz (57) ABSTRACT

A downhole measurement module includes a microcontroller having a plurality of inputs and a sensor connected to a first input of the plurality of inputs. A switch is connected to a second input of the plurality of inputs. The microcontroller implements a measurement program to receive measurements from the sensor, the measurement program being based on a setting of the switch.

12 Claims, 5 Drawing Sheets

FIG. 8

DEVICES, SYSTEMS, AND METHODS FOR COLLECTING DOWNHOLE MEASUREMENTS

CROSS-REFERENCE TO RELATED APPLICATIONS

The subject disclosure claims priority from U. S. Provisional Appl. No. 63/382,226, filed on Nov. 3, 2022, herein incorporated by reference in its entirety.

BACKGROUND

Natural resources such as oil, natural gas, and geothermal reservoirs are often found in reservoirs located hundreds to thousands of feet underground. Such natural resources are often accessed by drilling a wellbore from a surface location to the reservoir. The wellbore may be vertical and/or may include one or more curves, dog legs, or horizontal sections. The drilling operation may include one or more sensors to determine features of the wellbore, including survey information, directional information, and so forth.

SUMMARY

In some aspects, the techniques described herein relate to a downhole measurement module. The downhole measurement module includes a microcontroller having a plurality of inputs and a sensor connected to a first input of the plurality of inputs. A switch is connected to a second input of the plurality of inputs. The microcontroller implements a measurement program to receive measurements from the sensor, the measurement program being based on a setting of the switch.

In some aspects, the techniques described herein relate to a downhole measurement module, including a sensor and a switch movable between a plurality of switch settings. A microcontroller includes a plurality of inputs, the sensor being connected to a first input of the plurality of inputs, the switch being connected to a second input of the plurality of inputs. The microcontroller includes a processor in communication with the sensor and the switch, the processor causing the microcontroller to operate in one of a plurality of modes based upon the plurality of switch settings.

In some aspects, the techniques described herein relate to a method for performing downhole measurements. At a microcontroller of a downhole measurement module, the method includes identifying a switch setting on a switch connected to a first input of the microcontroller. The microcontroller determines a measurement program for a sensor connected to a second input of the microcontroller, the measurement program being based on the switch setting and instructs the sensor to collect measurements based on the measurement program. The microcontroller records the measurements on memory connected to the microcontroller.

This summary is provided to introduce a selection of concepts that are further described below in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for control of a downhole measurement module that collects downhole measurements. A microcontroller may control collection of the downhole measurements by the downhole measurement module, including control of any connected sensors and the recording in memory measurements from the connected sensors. The microcontroller may be connected to a switch. A setting of the switch may determine a measurement program for the microcontroller. The measurement program may include multiple instructions for the microcontroller, such as a hibernation period, a sensor to collect measurements, a measurement frequency, any other instructions for the microcontroller, and combinations thereof. The microcontroller may identify the switch setting (e.g., the logic setting) of the switch, and enter or establish a particular measurement program, based on the identified switch setting. In this manner, the microcontroller may enter a particular measurement program using a setting on the switch.

Conventionally, a measurement program for the microcontroller may be uploaded to the microcontroller by a specialized technician or engineer. In some situations, the engineer may travel to the wellsite to upload the measurement program. This may be expensive in time and/or materials. In some situations, the engineer may program the microcontroller at a shop, including delays for transportation for the downhole measurement module to the wellsite. But adjustments to a drilling schedule, including delays and/or faster-than-expected use, may result in the microcontroller not capturing the intended data at the intended depth below the surface.

In accordance with at least one embodiment of the present disclosure, the switch is a manual or mechanical switch. The setting of the switch may be manually changed at a wellsite. For example, a drilling operator may have a look-up table of measurement programs, with each measurement program associated with a particular switch setting. The drilling operator may identify a desired measurement program, and adjust the switch setting of the switch to the switch setting associated with the desired measurement program. The drilling operator may not be a specially trained engineer or technician. In this manner, the measurement program of the microcontroller may be set based on the switch setting of the switch. This may reduce the cost of the wellbore by reducing or preventing an engineer from traveling to the wellsite. In some embodiments, setting the measurement program with a switch on-site allows the measurement program to be set on the microcontroller when the microcontroller is ready to be installed on the drill string. This may help to reduce or prevent the microcontroller from not capturing the intended data at the intended depth below the surface.

Figure 1:
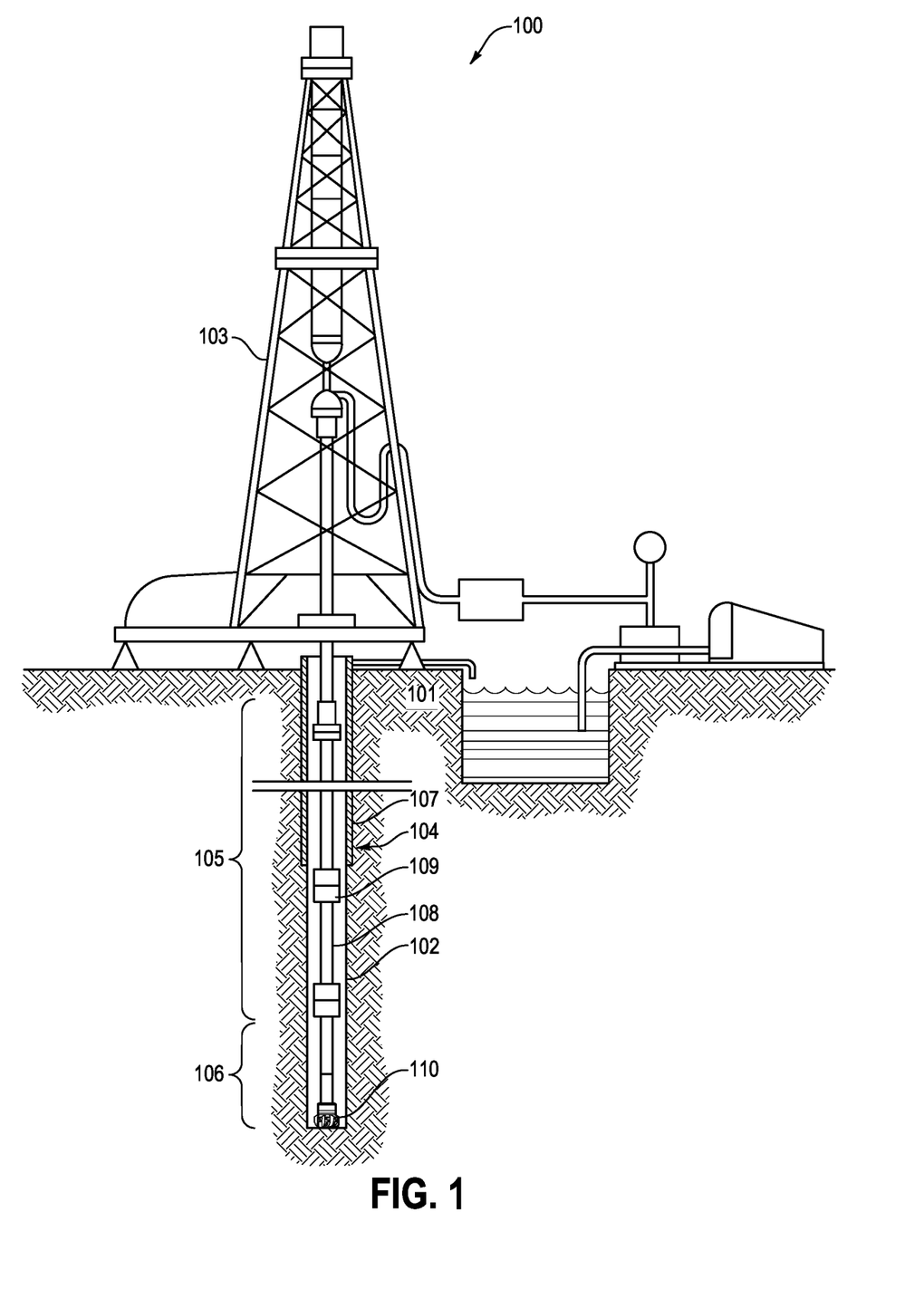
FIG. 1 shows one example of a drilling system for drilling an earth formation to form a wellbore, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 further includes additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole measurement modules, downhole motors, under-reamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore 102. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

The illustrated BHA 106 includes a microcontroller on a downhole measurement module. While embodiments of the present disclosure discuss the microcontroller as being located on a downhole measurement module, it should be understood that the microcontroller may be located on any downhole tool or element. For example, the microcontroller may be located on an MWD, an LWD, an RSS, a downhole tool, a downhole sensor, a sub, any other downhole element, and combinations thereof. The downhole measurement module may be configured to collect downhole measurements. The downhole measurements may include any type of downhole measurements. For example, the downhole measurements may include survey measurements, such as accelerometer, visual, infrared, gravimetric, nuclear magnetic resonance, any other type of survey measurement, and combinations thereof. In some examples, the downhole measurements may include directional or positional measurements, such as azimuth, inclination, dead-reckoning, any other type of directional or positional measurements, and combinations thereof. In some embodiments, the downhole measurements includes status measurements of a downhole tool.

The BHA 106 may include a switch connected to the microcontroller. The switch may include a plurality of switch settings (e.g., logic settings). Each switch setting may be associated with a measurement program for the microcontroller. The switch setting on the switch may be set at any time before the downhole measurement module is connected to the BHA 106 and installed downhole. For example, the switch setting on the switch may be set while the downhole measurement module is being stored in a lay-down yard at the well site, while the downhole measurement module is being staged for connection to the BHA 106 (such as at the drill rig 103), while the downhole measurement module is connected to the drill string 105 above the collar of the wellbore, at any other location at the wellsite, and combinations thereof. As discussed herein, setting the switch settings at the wellsite may help to reduce costs by reducing a number of engineers that travel to the wellbore and/or may help to ensure that the measurements collected by the downhole measurement modules are collected at the desired time and/or downhole location.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 is a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

Figure 2:
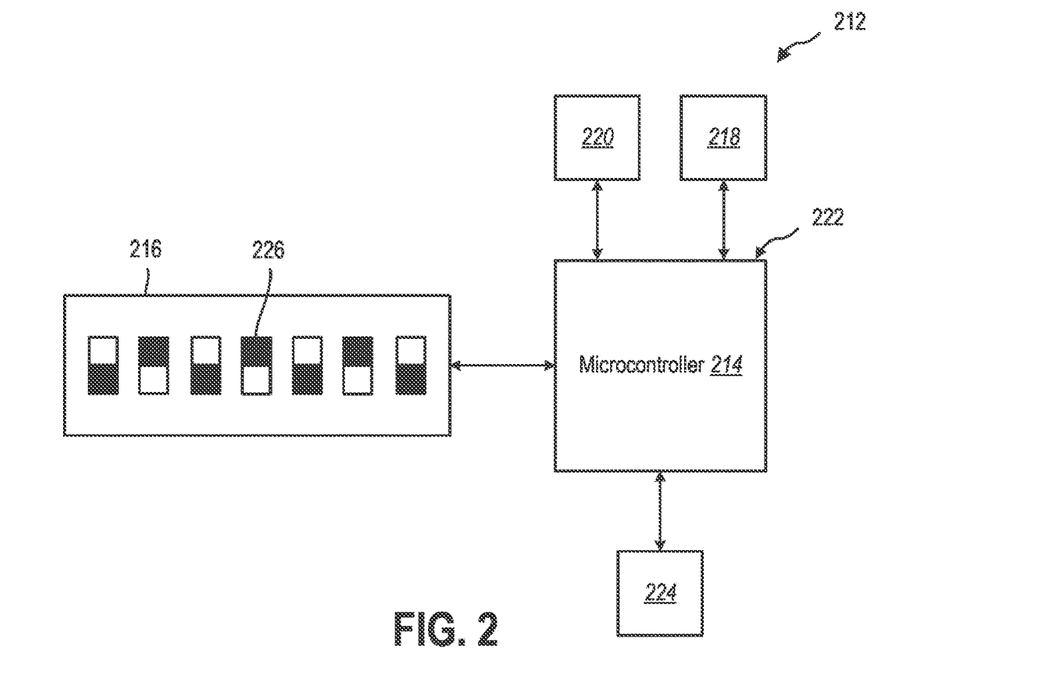
FIG. 2 is a schematic representation of a downhole measurement module including a microcontroller and a switch, according to at least one embodiment of the present disclosure.

FIG. 2 is a schematic representation of a downhole measurement module 212 including a microcontroller 214 and a switch 216, according to at least one embodiment of the present disclosure. The microcontroller 214 may be any type of microcontroller. For example, the microcontroller 214 may be a processor configured to control or manage the downhole measurement module 212. In some embodiments, the microcontroller 214 is a low-power controller. For example, the microcontroller 214 may utilize small amounts of power, thereby allowing the microcontroller 214 to utilize an independent power source 218, such as a battery or supercapacitor. This independent power source 218 may provide the downhole measurement module 212 with power to perform its operations, such as data collection from one or more sensors 220. In some embodiments, the downhole measurement module 212 and/or the microcontroller 214 are not connected to a central power source of a BHA. For example, the downhole measurement module 212 and/or the microcontroller 214 may not be connected to a power generator, such as a mud-motor or turbine connected to the BHA.

The microcontroller 214 may include a plurality of inputs 222. The inputs 222 may be connected to one or more elements of the downhole measurement module 212. For example, the switch 216, the sensors 220, the independent power source 218, memory 224, any other elements, and combinations thereof may be connected to an input of the plurality of inputs 222. The inputs 222 may be input/output (I/O) connections. For example, the I/O connections may be able to send and receive information from the connected element. This may allow the microcontroller 214 to control operation of the sensors 220, to detect the switch setting (e.g., the logic setting) of the switch 216, to receive power from the independent power source 218, and to read and write information to the memory 224.

As discussed herein, the switch 216 may be adjustable to a plurality of switch settings. The switch 216 includes a plurality of levers 226. The levers 226 may be movable between two positions, or between an on position and an off position. The combination of levers 226 positions may be the switch setting of the switch 216. The microcontroller 214 may identify the switch position of the switch 216 by determining which of the levers 226 are in the on position. As discussed herein, the microcontroller 214 may associate the switch position with a particular measurement program. After detecting the switch position, the microcontroller 214 may implement the associated measurement program.

In accordance with at least one embodiment of the present disclosure, the switch 216 is a mechanical switch or a manual switch. The position of each of the levers 226 may be manually changed between the on position and the off position. For example, to move a lever 226 between the on position and the off position, an operator may physically change the position of the lever 226. The operator may consult a look-up table that associates measurement programs with switch positions. The operator may have an instruction to implement a particular measurement program, and may adjust the position of the levers 226 to the associated switch position.

In the embodiment shown, the switch 216 has eight levers 226. As will be understood, this may provide the switch 216 with 256 switch positions. But it should be understood that the switch 216 may have any number of levers 226 with an accompanying number of switch positions. In some embodiments, the switch 216 is a dual in-line package (DIP) switch. In some embodiments, the switch 216 is a surface mount device (SMD) switch.

The switch 216 may be locally or remotely actuated. For example, the downhole measurement module 212 may include an actuation mechanism (e.g., servo motors; memory materials, etc.). The actuation mechanism may be configured to mechanically change the position of the levers 226 based on an instruction from a remote operator and/or remote computing device. In this manner, the housing for the switch 216 may not be accessed prior to adjusting the switch position. This may help to reduce the amount of time taken to change the switch setting of the switch 216.

The switch 216 can be powered or unpowered. For example, an unpowered switch 216 may not include any processor or other powered element. The unpowered switch 216 may not be connected to any power element, including the independent power source 218 or other power element. In this manner, the unpowered switch 216 may not draw on the limited power provided by the independent power source 218. This may extend the life of the independent power source 218, thereby allowing the downhole measurement module 212 to collect more measurements and/or collect measurements for longer.

The microcontroller 214 can be used to detect or identify the switch setting of the switch 216. For example, the output of the switch 216 may be connected to an input 222 of the microcontroller 214. The microcontroller 214 may identify the switch setting of the switch 216 by determining which of the levers 226 are in the on position and the off position. For example, the microcontroller 214 may send a signal to the switch 216, and the response of the signal may determine the switch setting of the switch 216.

The microcontroller 214 may include firmware that controls the operation of the microcontroller 214. The firmware may include instructions for the sensors 220 to record information on the memory 224. In some embodiments, instructions are stored as one or more measurement programs. A measurement program may include a series of actions taken by the microcontroller 214 and the connected elements of the downhole measurement module 212. The actions may include any type of action, for example, the actions of a measurement program may include a hibernation period, an instruction for a particular sensor 220 to collect measurements, a measurement schedule or frequency, trigger conditions for the sensor 220 to transition to and/or enter the sensing mode and begin collecting measurements, instructions for recording measurements in the memory 224, any other action, and combinations thereof.

In accordance with at least one embodiment of the present disclosure, in the hibernation period, the downhole measurement module 212 operates in a low-power mode. The hibernation period may be time-based. A timer or clock on the microcontroller 214 may identify the end of the hibernation period. In some embodiments, the hibernation period is condition-based. For example, the microcontroller 214 may monitor for a trigger condition, such as the detection of certain downhole conditions. The microcontroller 214 may monitor with a low frequency, such as taking a measurement every day, every several hours, every hour, or other measurement frequency. When the microcontroller 214 detects the trigger condition, the microcontroller 214 may come out of the hibernation mode and transition to and/or enter a different mode, such as the sensing mode. This may allow the microcontroller 214 to conserve power, thereby preventing or reducing premature depletion of the independent power source 218 based on usage by the switch 216.

After the hibernation period is over, has ended, or expired, the microcontroller 214 may transition from the hibernation mode to a different mode. For example, the microcontroller 214 may transition to a sensing mode. In the sensing mode, the microcontroller 214 may instruct one of the sensors 220 to collect measurements. In some embodiments, the microcontroller 214 instructs the sensor 220 to collect measurements with a collection frequency. The sensing mode may be a full-power mode, or a power mode that draws more power than both the hibernation mode and the trigger detection mode. In some embodiments, the sensing mode has different power settings based on the particular sensor 220 being used. For example, different sensors may have different power requirements, and the sensing mode may utilize the minimum power for each particular sensor 220.

After the hibernation period is over, has ended, or expired, the microcontroller 214 can in some embodiments transition from the hibernation mode to a trigger detection mode, or enter the trigger detection mode from the hibernation mode. The hibernation mode may be a low-power mode, where the microcontroller 214 only includes a timer or clock, thereby drawing minimal power from the independent power source 218.

Optionally, the trigger detection mode is a mid-power mode (e.g., a third, half, two-thirds, or another percentage of the difference in power between the sensing mode and the low-power mode or a power mode between the sensing mode and the low-power mode). In the trigger detection mode, the microcontroller 214 may cause a trigger detection sensor to detect whether a trigger condition has been met. The trigger condition may include any trigger condition, such as a particular temperature, a particular formation type, a particular RPM, a particular fluid flow rate, a particular azimuth, a particular inclination, any other trigger condition, and combinations thereof. In some embodiments, after the trigger condition has been met, the microcontroller 214 transitions from the trigger detection mode to the sensing mode. In the same or other embodiments, in the trigger detection mode, the microcontroller 214 causes the trigger detection sensor to take a trigger detection measurement with a trigger detection frequency. Optionally, the trigger detection frequency is less than the collection frequency. For example, the trigger detection frequency may be periodic. As discussed herein, the microcontroller 214 may transition from the trigger detection mode to the sensing mode based on the detection of the trigger and/or the microcontroller 214 may enter the sensing mode from the trigger detection mode based on the detection of the trigger.

In some embodiments, the measurement program includes a stop-measurement condition, or conditions under which the microcontroller 214 causes the sensor 220 to stop collecting measurements. For example, the stop-measurement condition may include any type of stop-measurement condition, such as a duration, a number of measurements, a particular measurement threshold (e.g., a high measurement value or a low measurement value), any other stop-measurement condition, and combinations thereof.

As discussed herein, the firmware of the microcontroller 214 may include a plurality of measurement programs. Each of the measurement programs may be associated with a switch setting (e.g., one switch setting or a plurality of switch settings) of the switch 216. When the microcontroller 214 detects a particular switch setting, the microcontroller 214 may compare the switch setting to the list of switch settings, and implement the associated measurement program. The measurement programs may include any combination of actions implemented by the downhole measurement module 212. For example, the measurement program may include any combination of hibernation modes, trigger detection modes, and collection modes from a particular sensor 220.

In some embodiments, the measurement program includes two or more hibernation modes. In some embodiments, some or all of the two or more hibernation modes can have the same hibernation frequency. In some embodiments, some or all of the two or more hibernation modes have two different hibernation periods. The measurement program optionally includes two or more trigger detection modes, which can have the same and/or different trigger conditions. In some embodiments, the measurement program includes two or more collection modes. The two or more collection modes can use the same sensor and/or have the same collection frequency. In some embodiments, the two or more collection modes use different sensors and/or have different collection frequencies. In some embodiments, the sensors 220 use the same stop-measurement condition, while in the same or other embodiments, the sensors 220 use a different stop-measurement condition.

One or more of the switch settings are, in some embodiments, associated with management of the downhole measurement module 212. For example, a switch setting may be associated with an update condition of the microcontroller 214. When the microcontroller 214 identifies that the switch 216 has a switch setting associated with the update condition, the microcontroller 214 may be prepared to receive software and/or firmware updates. For example, an engineer, technician, or operator may apply the switch setting associated with the update condition to place the microcontroller 214 in the update condition. While the microcontroller 214 is in the update condition, one or more of the engineer, technician, or operator may connect to a communication element of the microcontroller 214 and upload a software and/or firmware update to the microcontroller 214. This may help to improve the ease of update installation.

The switch 216 optionally has a switch setting that is associated with a download condition of the microcontroller 214. The microcontroller 214 may have a communication element connected to the memory 224. The communication element may transmit the measurements and/or other data stored on the memory 224 to a remote computing device. The microcontroller 214 can transmit the measurements and/or other information stored on the memory 224 to the remote computing device in any manner. For example, the microcontroller 214 may transmit the measurements and/or other information stored on the memory 224 wirelessly, such as over a Wi-Fi connection, over the Internet, over a Bluetooth connection, any other wireless connection, and combinations thereof. In some examples, the microcontroller 214 may transmit the measurements and other information stored on the memory 224 over a wired connection, such as through a physical plug, a local area network (LAN), a USB connection, any other wired connection, and combinations thereof.

In some embodiments, the microcontroller 214 is not transmitting the stored measurements and/or other information to the remote computing device, or is not doing so unless the switch 216 is in the switch setting associated with the download condition. For example, the microcontroller 214 may include firmware that controls transmittal of the measurements and/or other information stored in the memory 224. The firmware may not allow transmittal of the memory 224 until the switch 216 is identified as having the switch setting associated with the download condition. This may help to prevent or reduce unauthorized downloading of the memory 224, thereby increasing the data security of the microcontroller 214.

Figure 3:
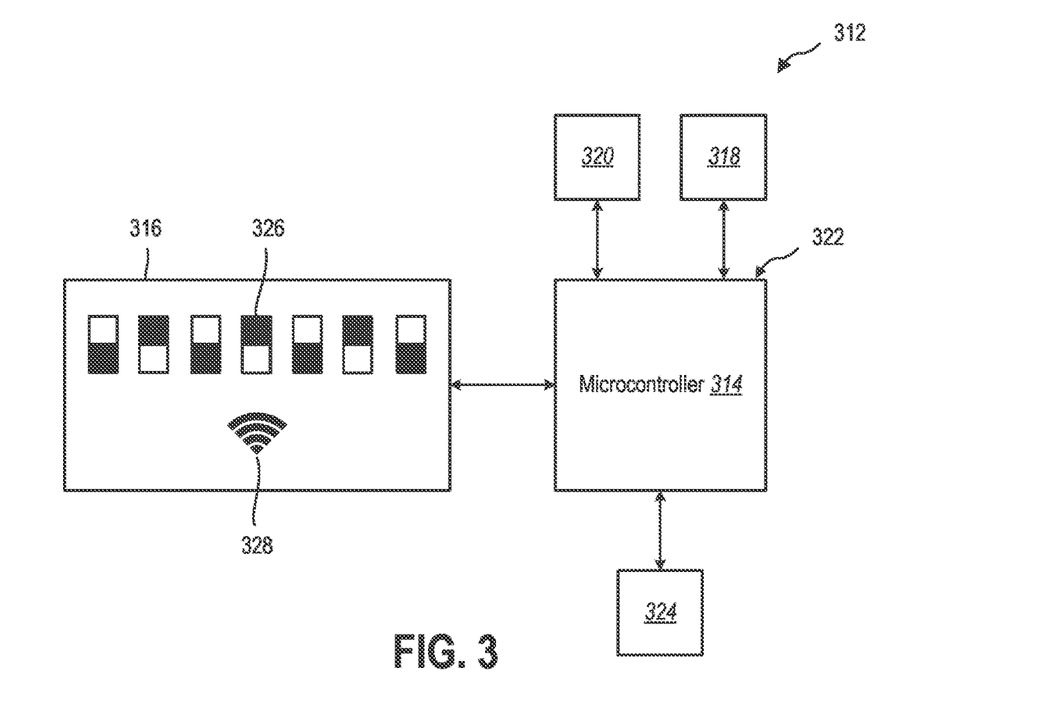
FIG. 3 is a schematic representation of a downhole measurement module including a microcontroller and a switch, according to at least one embodiment of the present disclosure.

FIG. 3 is a schematic representation of a downhole measurement module 312 including a microcontroller 314 and a switch 316, according to at least one embodiment of the present disclosure. In some embodiments, the microcontroller 314 is a low-power controller. For example, the microcontroller 314 may utilize small amounts of power, thereby allowing the microcontroller 314 to utilize an independent power source 318, such as a battery or supercapacitor. This independent power source 318 may provide the downhole measurement module 312 with power to perform its operations, such as data collection from one or more sensors 320.

The microcontroller 314 may include a plurality of inputs 322. The inputs 322 may be connected to one or more elements of the downhole measurement module 312. For example, the switch 316, the sensors 320, the independent power source 318, memory 324, any other elements, and combinations thereof may be connected to an input of the plurality of inputs 322.

The switch 316 may include a plurality of latches 326. The switch position of the switch 316 may be determined by the position of each of the latches 326. As discussed herein, in some embodiments, the switch 316 is an unpowered switch and/or a mechanical switch. In some embodiments, the position of the latches 326 is remotely controlled. For example, the switch 316 may include a communication element 328. The communication element 328 may receive instructions from a remote computing device to change the position of the latches 326. In this manner, an operator may not need to open the housing of the downhole measurement module 312 to adjust the switch position of the switch 316. In other words, the position of the latches 326 may be changed without manual operator directly (e.g., manually) changing the position.

The communication element 328 can be any type of suitable communication element 328. For example, the communication element 328 may be a wireless connection, such as a WiFi connection, a Bluetooth connection, a Zigbee connection, an IR receiver, a mesh network connection, any other wireless connection, and combinations thereof. In some examples, communication element 328 may be connected to the Internet. In some embodiments, the communication element 328 is connected to a local network, such as a wireless area network (WAN), LAN, intranet, a mesh network, any other local network, and combinations thereof.

The position of the latches 326 can be changed manually, or by using one or more actuators. For example, each of the latches 326 can include an actuator. The actuator may change the position of the latches 326 to adjust the switch setting. When the communication element 328 receives an instruction to adjust the switch setting, the actuators of the switch 316 may cause the appropriate latches 326 to change position (e.g., between the on position and the off position). In some embodiments, the communication element 328 is directly connected to the actuators of the latches 326. A remote computing device may provide the communication element 328 with instructions to adjust the position of the latches 326. The switch 316 can include or communicate with a processor connected to the actuators. The processor may receive the revised switch setting and cause the actuators to move the latches 326 into the appropriate position for the switch setting.

In some embodiments, the switch 316 is a digital switch. For example, the switch 316 may include a plurality of switch settings. The microcontroller 314 may use a look-up table or query the digital switch 316 for the switch setting, and the digital switch 316 optionally provides the microcontroller 314 with the appropriate switch setting. In some embodiments, the digital switch 316 receives instructions from the communication element 328. This may cause the switch 316 to adjust the digital switch setting. In some embodiments, the digital switch 316 actively transmits the switch setting to the microcontroller 314.

In some embodiments, the switch may be an analog switch. Optionally, a potentiometer may be connected to an analog input on the microcontroller. An analog input or an analog switch may allow for additional permutations and/or settings based on the voltage levels set in the firmware of the analog switch.

Figure 4:
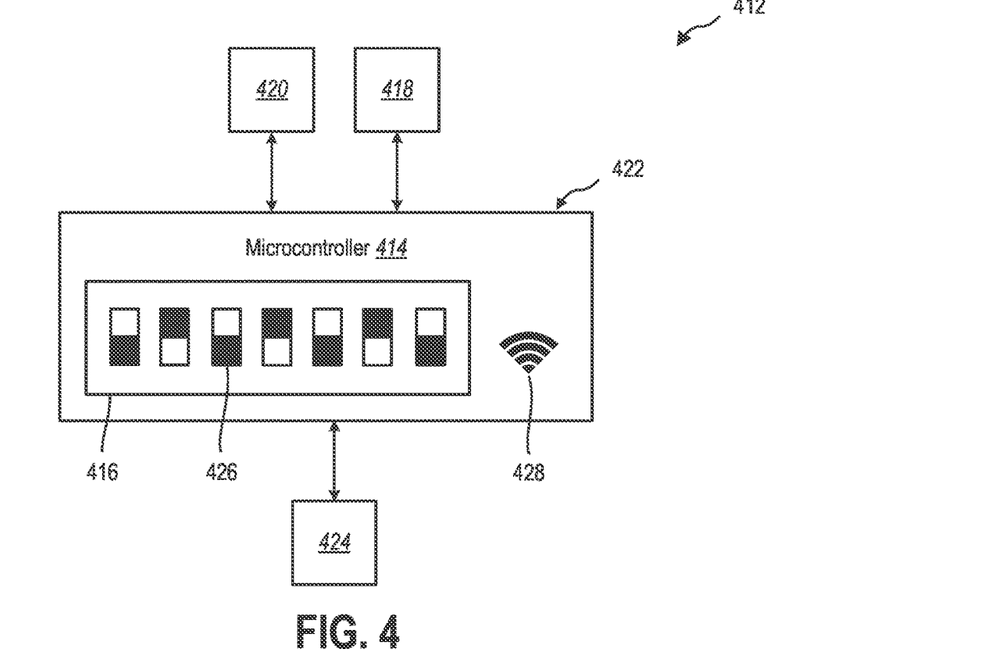
FIG. 4 is a schematic representation of a downhole measurement module including a microcontroller and a switch, according to at least one embodiment of the present disclosure.

FIG. 4 is a schematic representation of a downhole measurement module 412 including a microcontroller 414 and a switch 416, according to at least one embodiment of the present disclosure. The microcontroller 414 can operate as a low-power controller. For example, the microcontroller 414 may utilize small amounts of power, thereby allowing the microcontroller 414 to utilize an independent power source 418, such as a battery or supercapacitor. This independent power source 418 may provide the downhole measurement module 412 with power to perform its operations, such as data collection from one or more sensors 420.

The microcontroller 414 may include a plurality of inputs 422. The inputs 422 may be connected to one or more elements of the downhole measurement module 412. For example, the sensors 420, the independent power source 418, memory 424, any other elements, and combinations thereof may be connected to an input of the plurality of inputs 422.

The microcontroller 414 may include a switch 416. The switch 416 may be formed as a part of the microcontroller 414. For example, the switch 416 may be integrally formed as part of the microcontroller 414. In some embodiments, the switch 416 is formed as part of a printed circuit board of the microcontroller 414. This may help to simplify the manufacture and the installation of the downhole measurement module 412.

As discussed herein, the switch 416 may include a plurality of latches 426. The switch position of the switch 416 may be determined by the position of each of the latches 426. As discussed herein, in some embodiments, the switch 416 is an unpowered switch and a mechanical switch. In some embodiments, the position of the latches 426 is remotely controlled. For example, the switch 416 and/or the microcontroller 414 may include a communication element 428. The communication element 428 may receive instructions from a remote computing device to change the position of the latches 426. In this manner, an operator may not need to open the housing of the downhole measurement module 412 to adjust the switch position of the switch 416.

Figure 5:
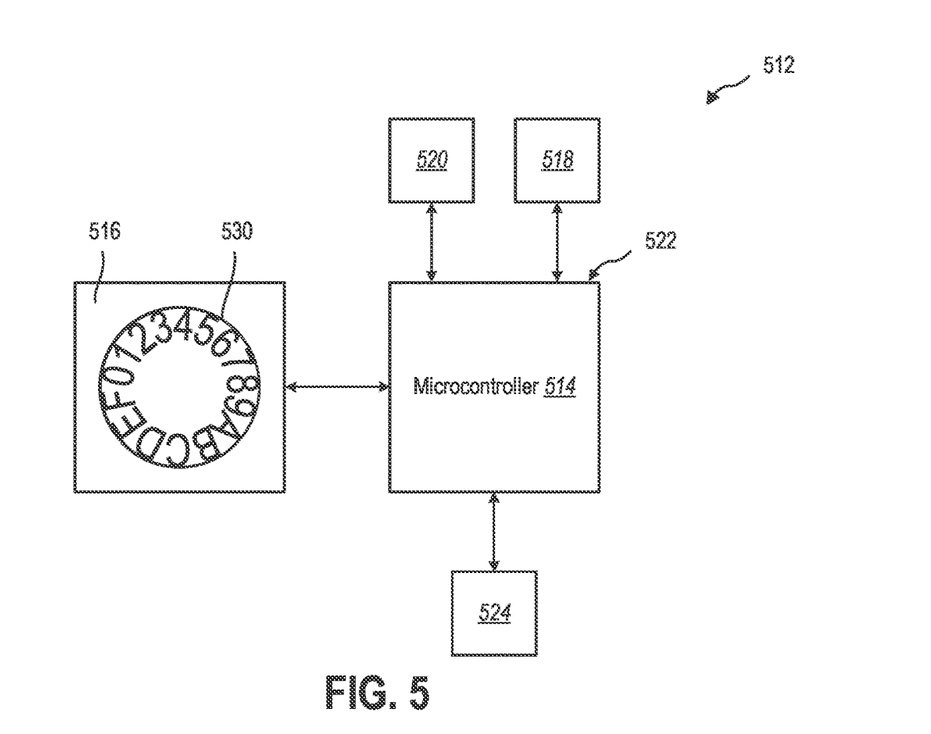
FIG. 5 is a schematic representation of a downhole measurement module including a microcontroller and a switch, according to at least one embodiment of the present disclosure.

FIG. 5 is a schematic representation of a downhole measurement module 512 including a microcontroller 514 and a switch 516, according to at least one embodiment of the present disclosure. In some embodiments, the microcontroller 514 is a low-power controller. For example, the microcontroller 514 may utilize small amounts of power, thereby allowing the microcontroller 514 to utilize an independent power source 518, such as a battery or supercapacitor. This independent power source 518 may provide the downhole measurement module 512 with power to perform its operations, such as data collection from one or more sensors 520.

The microcontroller 514 may include a plurality of inputs 522. The inputs 522 may be connected to one or more elements of the downhole measurement module 512. For example, the switch 516, the sensors 520, the independent power source 518, memory 524, any other elements, and combinations thereof may be connected to an input of the plurality of inputs 522.

In some embodiments, the switch 516 is a rotary switch. For example, the switch 516 may include a rotary dial 530. The switch 516 may be moved between switch settings based on a movement of the rotary dial 530. As discussed herein, the microcontroller 514 may identify the switch setting from the switch 516, which may be associated with a measurement program of the microcontroller 514.

Figure 6:
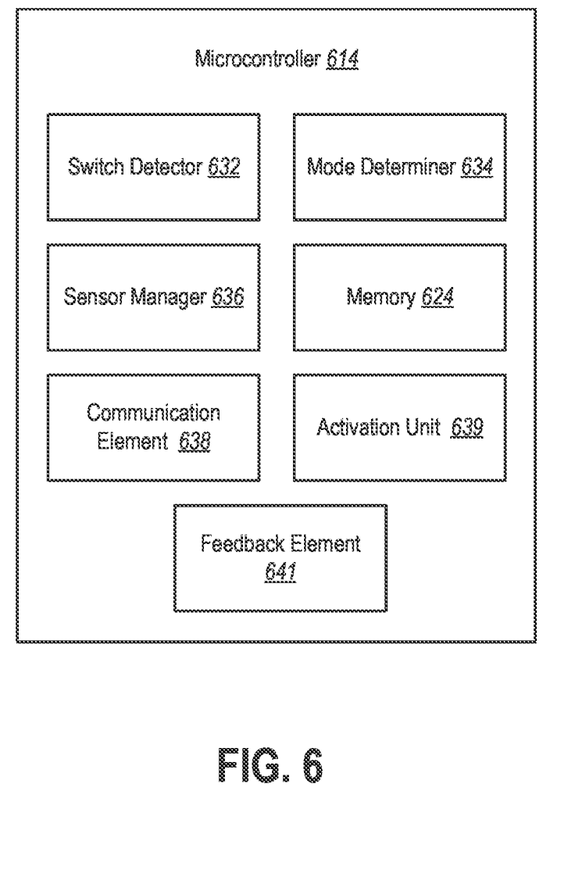
FIG. 6 is a representation of a microcontroller, according to at least one embodiment of the present disclosure.

FIG. 6 is a representation of a microcontroller 614, according to at least one embodiment of the present disclosure. Each of the components of the microcontroller 614 can include software, hardware, or both. For example, the components can include one or more instructions stored on computer-readable storage media and executable by one or more processors of one or more computing devices, such as a client device or server device. When executed by the one or more processors, the computer-executable instructions of the microcontroller 614 can cause the computing device(s) to perform the methods described herein. Alternatively, the components can include hardware, such as a special-purpose processing device to perform a certain function or group of functions. Alternatively, the components of the microcontroller 614 can include a combination of computer-executable instructions and hardware. In some embodiments, the computer-readable storage media (e.g., RAM, ROM, EEPROM, flash memory, etc.) may be separate from, but accessible to, the microcontroller 614.

The microcontroller 614 of this embodiment includes a switch detector 632. The switch detector 632 may detect the presence of a switch. In some embodiments, the switch detector 632 identifies a switch setting of the switch. The switch detector 632 may identify the switch setting of the switch in any manner, including by identifying which latches on the switch are in the on and off position.

The microcontroller 614 of the illustrative embodiment includes a mode determiner 634. The mode determiner 634 may determine an operating mode of the microcontroller 614. For example, the mode determiner 634 may determine a measurement program for the microcontroller 614 based on the switch setting. In some embodiments, the mode determiner 634 consults or refers to a look-up table or other mechanism to determine the measurement program. The look-up table may include a series of switch settings and associated measurement programs. For example, the mode determiner 634 may receive the switch setting from the switch detector 632. The mode determiner 634 may compare the switch setting to the look-up table to determine the associated measurement program.

In some embodiments, the mode determiner 634 provides the measurement program to the microcontroller 614. For example, after the mode determiner 634 has determined the measurement program associated with the switch setting, the mode determiner 634 may provide the measurement program to the microcontroller 614. The microcontroller 614 may implement the measurement program.

The microcontroller 614 may include a sensor manager 636. The sensor manager 636 may provide instructions to one or more sensors to collect sensor measurements. In some embodiments, the sensor manager 636 sends the instructions to the one or more sensors based on the measurement program. For example, the measurement program may include a particular set of measurements to be collected from a particular sensor with a particular measurement frequency. The sensor manager 636 may instruct the identified sensor to collect the measurements at the identified measurement frequency. In this manner, the microcontroller 614 may collect measurements based on the switch position of the switch.

The microcontroller 614 can be used to record the measurements to memory 624. In some embodiments, when the microcontroller 614 is powered up, the microcontroller 614 causes a new file in memory 624 to be opened. The microcontroller 614 may write any measurements or other information collected while the microcontroller 614 is powered up to the memory 624. When the microcontroller 614 is powered down, the microcontroller 614 may save the file in the memory 624. In some embodiments, the microcontroller 614 prepares new files and/or saves to different files based on the data type, the time of collection, the sensor type, any other distinction, and combinations thereof.

The microcontroller 614 can include a communication element 638. As discussed herein, the communication element 638 may receive information from a remote computing device. For example, the communication element 638 may receive software and/or firmware updates, measurement programs, instructions for the switch, any other information, and combinations thereof. In some embodiments, the microcontroller 614 transmits the measurements recorded on the memory 624 to the remote computing device.

An activation unit 639 can be included in or accessible to the microcontroller 614 in some embodiments. The activation unit 639 may be used to activate the microcontroller 614. For example, the activation unit 639 may include a sensor that may receive an input to activate the microcontroller 614. Activating the microcontroller 614 may include transitioning the microcontroller 614 from a hibernation mode (e.g., an unpowered mode, an ultra-low power mode, a lower power mode) to an identification mode. In the identification mode, the switch detector 632 of the microcontroller 614 may identify the state of the switch. Based on the state of the switch, the microcontroller 614 may transition to any of the modes discussed herein. For example, the microcontroller 614 may transition back into a hibernation mode, a detect mode, a sensing mode, any other mode, and combinations thereof.

The activation unit 639 may include any type of sensor. For example, the activation unit 639 may include a magnetic field sensor, such as a Hall effect sensor. When the magnetic field sensor is triggered, the microcontroller 614 may enter the identification mode and identify the state of the switch. To trigger the magnetic field sensor, an operator may place a magnet in proximity to the activation unit 639. This may cause the magnetic field sensor in the activation unit 639 to trip, thereby placing the microcontroller 614 in the identification mode.

The activation unit 639 can be activated in any suitable manner, including using an activation tool. In the example of a magnetic field sensor, the activation tool may include a magnet that is sufficiently strong to trigger the activation unit 639. For example, the activation unit 639 may be located in a housing. The activation tool may include a magnet with a magnetic field that is strong enough to pass through the housing (e.g., a face plate) and trigger the magnetic field sensor. In some embodiments, the housing includes a magnetically permeable material. For example, the portion of the housing located directly opposite the activation unit 639 may be formed from a magnetically permeable plate. This may allow the magnetic field from the activation tool to pass through the housing and to the activation unit 639.

In some embodiments, the activation unit 639 places the microcontroller 614 into the identification mode when the activation unit 639 is tripped in a pattern. For example, the activation tool may move into and out of the detection range of the activation unit 639 to trip the sensor in a pattern. This may help to prevent inadvertent tripping of the magnetic field sensor by stray or environmental magnetic fields.

The activation tool of some embodiments can be or include a permanent magnet and/or an electromagnet. In some embodiments, the electromagnet may be external to the activation unit. The electromagnet may alter the local magnetic field in the proximity of the sensor in the activation unit 639, including turning the magnetic field on and off, adjusting the strength of the magnetic field, adjusting the polarity of the magnetic field, any other adjustment to the magnetic field, and combinations thereof. In some embodiments, the activation tool adjusts the magnetic field to trigger the sensor in the activation unit 639.

In some embodiments, the activation unit 639 is or includes a strain sensor such as a strain gauge. The strain sensor in the activation unit 639 may sense strain in an area of the housing and/or sub in which the microcontroller 614 is located. For example, the strain sensor may sense the torsional strain in the housing when the tool is made up to the make-up torque. In some embodiments, the strain sensor senses the presence of a clamp or other intentional force applied to a specific area of the housing containing the gauge. For example, an operator may torque a bolt in a hole on the housing or a pocket cover to a specific torque. This may activate the microcontroller 614. In some embodiments, the microcontroller 614 remains activated while the strain sensor senses a threshold strain.

The activation unit 639 optionally is or includes an electromagnetic (EM) receiver. When the EM receiver receives an EM signal, the activation unit 639 may place the microcontroller 614 in the identification mode. The EM receiver may receive any type of EM signal, such as infrared, radio frequency, microwaves, x-rays, any other type of EM signal, and combinations thereof. In some embodiments, the portion of the housing outside of the EM receiver is transparent to the EM signals, allowing the signals to reach the EM receiver. In some embodiments, any activation tool that emits EM signals is used to transmit to the EM receiver. For example, the activation tool may include a television remote using an infrared transmitter in the remote paired to an infrared receiver in the tool. In some embodiments, the EM receiver includes a Bluetooth transceiver, and the activation tool may include a computing device, such as a smartphone, tablet, or laptop computer. An EM receiver may allow for remote instructions and/or complicated instructions to be passed to the EM receiver.

The activation unit 639 of some embodiments is or includes an acoustic sensor. For example, the microcontroller 614 may include an onboard microphone, a sound-sensitive accelerometer, or other acoustic sensor. The acoustic sensor may sense vibrations in the environment of the microcontroller 614. For example, the acoustic sensor may sense acoustic vibrations in the body of the housing supporting the microcontroller 614.

In some embodiments, the activation unit 639 is or includes a motion or position detection sensor. For example, the activation unit 639 may include an accelerometer that is configured to detect one or more specific motions or positions of the housing. The activation unit 639 may be configured to detect motions that would not normally be experienced by the housing of the microcontroller 614 during transportation or storage. In some embodiments, the location sensors include one or more magnetometers to detect positions relative to the Earth's magnetic field. This may allow the activation unit 639 to activate the microcontroller 614 without active input from the user.

The microcontroller 614 can include a feedback element 641. The feedback element 641 may provide feedback of the status of the microcontroller 614 to the operator. This may allow the operator to determine in which mode the microcontroller 614 is operating.

The feedback element 641 may provide any type of feedback to the operator. For example, the feedback element 641 may include a series of LED lights. The number, type, color, repeating pattern, or any quality of the LED lights may be used to communicate the status of the microcontroller 614 to the operator.

In some embodiments, the feedback element 641 includes any type of feedback. For example, the feedback element 641 may include haptic feedback. The feedback element 641 may include a piezo transducer, a solenoid, a vibrating element, any other haptic feedback element, and combinations thereof. In some embodiments, the feedback element 641 sends a physical impulse to the housing. The impulse may be detected (e.g., felt or heard). The impulse may include encoded data that, when decoded, may provide the operator with the status of the microcontroller 614. In some embodiments, this impulse is tuned to the resonant frequency of the housing or sub to reduce the power used to generate the impulse.

In some embodiments, the feedback element 641 includes an EM transmitter. For example, the feedback element 641 may include an antenna or other EM transmitter to transmit any type of EM signal, such as visible light, infrared light, short-range radio frequencies (e.g., Bluetooth or LoRa technology). In some embodiments, a local computing device, such as a smartphone, tablet, or laptop computer, receives the EM signal from the feedback element 641 to determine the status of the microcontroller 614.

Figure 7:
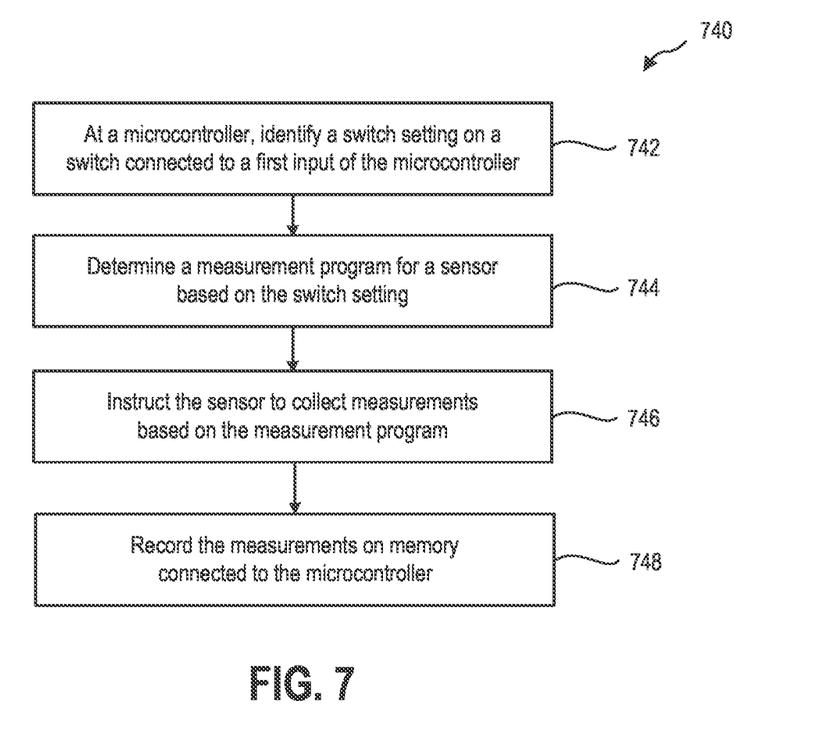
FIG. 7 is a flowchart of a method for collecting downhole measurements, according to at least one embodiment of the present disclosure.
Figure 8:
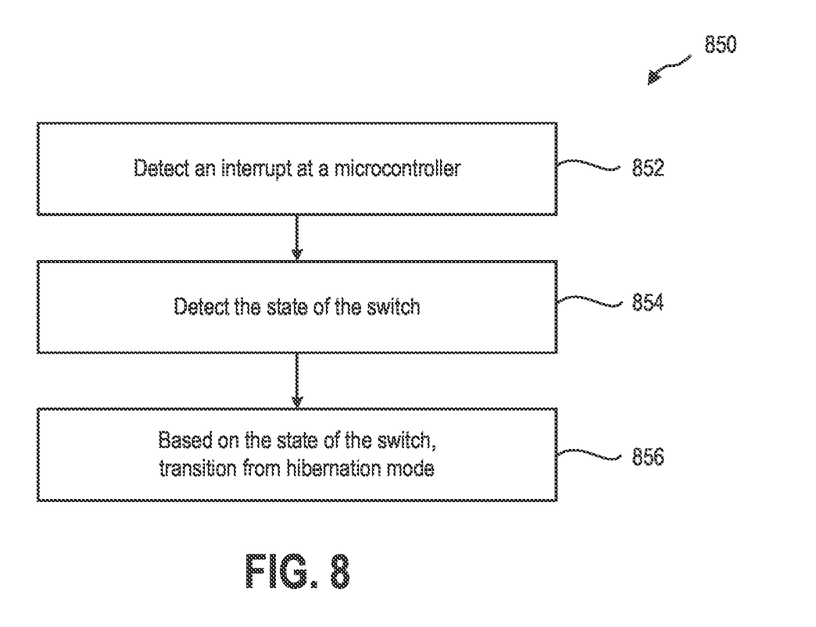
FIG. 8 is a flowchart of a method for collecting downhole measurements, according to at least one embodiment of the present disclosure.

FIGS. 7 and 8, the corresponding text, and the examples provide a number of different methods, systems, devices, and computer-readable media of the downhole measurement modules discussed herein. In addition to the foregoing, one or more embodiments can also be described in terms of flowcharts comprising acts for accomplishing a particular result, as shown in FIGS. 7 and 8. FIGS. 7 and 8 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a method 740 of a series of acts for performing downhole measurements, in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

A microcontroller may identify a switch setting on a switch connected to a first input of the microcontroller at 742. As discussed herein, the switch may be a mechanical switch and/or an unpowered switch. In some embodiments, the microcontroller determines a measurement program for a sensor connected to a second input of the microcontroller, the measurement program being based on the switch setting at 744. For example, the microcontroller may include a plurality of measurement programs associated with a switch setting of the switch. The microcontroller may compare the switch setting to the list of switch settings and measurement programs to determine the measurement program. The measurement program may include a plurality of modes. A first mode may include a low-power mode.

The microcontroller may instruct the sensor to collect measurements based on the measurement program at 746. In some embodiments, instructing the sensor to collect the measurements includes transitioning the microcontroller to a second mode of the plurality of modes. The second mode of the plurality of modes may be a sensing mode. In some embodiments, the microcontroller records the measurements on memory connected to the microcontroller at 748.

In some embodiments, the switch setting is a first switch setting. The microcontroller may identify a second switch setting on the switch. The second switch setting may be associated with a transmission mode and the microcontroller may transmit the measurements on the memory to a remote computing device. In some embodiments, the microcontroller is not transmitting the measurements to the remote computing device unless the second switch setting is identified.

As mentioned, FIG. 8 illustrates a flowchart of a method 850 of a series of acts for performing downhole measurements, in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

In some embodiments, an activation unit detects an interrupt event at a microcontroller at 852. For example, as discussed herein, the activation unit may include a sensor configured to detect a particular signal. When the activation unit detects the signal, the activation unit may instruct the microcontroller to enter an identification mode. In some embodiments, detecting the interrupt includes detecting a pattern in the input signal. If the activation unit detects a predetermined pattern in the input signal, then the microcontroller may enter the identification mode. In some embodiments, when the activation unit first detects the input signal, the microcontroller enters the identification mode while the activation unit searches for the predetermined pattern. If the predetermined pattern is not identified, then the microcontroller may return to hibernation.

In the identification mode, the microcontroller optionally detects a state of the switch at 854. For example, the microcontroller may send a signal to the switch and may determine the position of each of the levers of the switch. As discussed herein, based on the switch position of the switch, the microcontroller may transition from the hibernation mode at 856.

The embodiments of the downhole measurement module have been primarily described with reference to wellbore drilling operations; the downhole measurement modules described herein may be used in applications other than the drilling of a wellbore. In other embodiments, downhole measurement modules according to the present disclosure may be used outside a wellbore or other downhole environment used for the exploration or production of natural resources. For instance, downhole measurement modules of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. The terms "may" and "can", when used in reference to an illustrated or described embodiment, should be interpreted to mean that a particular embodiment includes such feature or component, but that such feature or component is optional and is excluded in other embodiments within the present disclosure.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions are embraced by the present disclosure, and that various changes, substitutions, and alterations may be made to embodiments disclosed herein without departing from the scope of the disclosure and claims. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A downhole measurement module, comprising:
a microcontroller having a plurality of inputs;
a sensor connected to a first input of the plurality of inputs; and
a switch connected to a second input of the plurality of inputs, the microcontroller implementing a measurement program to receive measurements from the sensor, the measurement program being based on a switch setting of the switch,
wherein the switch includes a plurality of switch settings, and the switch setting is a first switch setting of the plurality of switch settings, and
wherein the switch includes a second switch setting of the plurality of switch settings, the second switch setting instructing the microcontroller to transmit measurements recorded on a memory to a remote computing device.

2. The downhole measurement module of claim 1, wherein the switch is a mechanical switch.

3. The downhole measurement module of claim 2, wherein the mechanical switch includes a plurality of levers, the switch setting being based on a position of each lever of the plurality of levers.

4. The downhole measurement module of claim 1, wherein the switch is unpowered.

5. The downhole measurement module of claim 1, wherein the measurement program includes at least one of a hibernation period, a trigger detection mode, or a sensing mode.

6. The downhole measurement module of claim 1, wherein the microcontroller will not transmit the measurements unless the switch is in the second switch setting.

7. The downhole measurement module of claim 1, wherein the measurement program is stored in firmware on the microcontroller.

8. The downhole measurement module of claim 1, wherein the switch includes a communication element, and wherein a position of the switch is adjustable from a remote computing device.

9. A method for performing downhole measurements, comprising:
at a microcontroller of a downhole measurement module, identifying a switch setting on a switch connected to a first input of the microcontroller, wherein the switch setting is a first switch setting;
at the microcontroller, identifying a second switch setting on the switch;
determining a measurement program implemented by the microcontroller for a sensor connected to a second input of the microcontroller, the measurement program being based on the switch setting;
instructing the sensor to collect measurements based on the measurement program;
recording the measurements on memory connected to the microcontroller; and
instructing the microcontroller, via the second switch setting, to transmit the measurements recorded on the memory to a remote computing device.

10. The method of claim 9, wherein the microcontroller will not transmit the measurements to the remote computing device unless the second switch setting is identified.

11. The method of claim 9, wherein the measurement program includes a plurality of modes, and wherein, in a first mode of the plurality of modes, the microcontroller is in a low-power mode, and wherein instructing the sensor to collect the measurements includes transitioning the microcontroller to a second mode of the plurality of modes, the second mode of the plurality of modes being a sensing mode.

12. The method of claim 9, further comprising:
adjusting the switch setting on the switch.

* * * * *